(12) United States Patent
Faour et al.

(10) Patent No.: US 7,648,270 B2
(45) Date of Patent: Jan. 19, 2010

(54) TEMPERATURE MEASUREMENT OF AN INTEGRATED CIRCUIT

(75) Inventors: Fouad A. Faour, Wellington, CO (US); Brandon Gregory Greiner, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 769 days.

(21) Appl. No.: 10/817,265

(22) Filed: Apr. 2, 2004

(65) Prior Publication Data

US 2005/0220171 A1    Oct. 6, 2005

(51) Int. Cl.
G01K 7/01 (2006.01)
G01K 15/00 (2006.01)
G01R 31/00 (2006.01)

(52) U.S. Cl. .................. 374/178; 374/1; 374/173; 324/759; 327/512; 702/130; 702/99

(58) Field of Classification Search .......... 374/178, 374/1, 170–173; 324/759–769; 327/512–513; 702/99, 130–136
See application file for complete search history.

(56) References Cited

U.S. PATENT DOCUMENTS

| | | | | |
|---|---|---|---|---|
| 4,165,642 A | * | 8/1979 | Lipp | 374/170 |
| 5,195,827 A | * | 3/1993 | Audy et al. | 374/178 |
| 5,401,099 A | * | 3/1995 | Nishizawa et al. | 374/178 |
| 5,419,637 A | * | 5/1995 | Frye et al. | 374/178 |
| 5,639,163 A | * | 6/1997 | Davidson et al. | 374/178 |
| 5,828,329 A | * | 10/1998 | Burns | 341/155 |
| 5,838,191 A | * | 11/1998 | Opris et al. | 327/539 |
| 5,838,578 A | * | 11/1998 | Pippin | 716/4 |
| 5,963,082 A | * | 10/1999 | Dick et al. | 327/538 |
| 6,149,299 A | * | 11/2000 | Aslan et al. | 374/178 |
| 6,169,442 B1 | * | 1/2001 | Meehan et al. | 327/513 |
| 6,453,218 B1 | * | 9/2002 | Vergis | 374/178 |
| 6,554,469 B1 | * | 4/2003 | Thomson et al. | 374/178 |
| 6,674,185 B2 | * | 1/2004 | Mizuta | 374/178 |
| 6,774,653 B2 | * | 8/2004 | Gold et al. | 324/760 |
| 6,890,097 B2 | * | 5/2005 | Tanaka | 374/178 |
| 6,911,861 B2 | * | 6/2005 | Deng | 327/513 |
| 2004/0071183 A1 | * | 4/2004 | Tesi et al. | 374/1 |
| 2005/0099752 A1 | * | 5/2005 | Liepold et al. | 361/103 |

OTHER PUBLICATIONS

Maxim Integrated Products, http://www.maxim-ic-com, "Remote/Local Temperature Sensor with Dual-Alarm Outputs and SMBus Serial Interface", MAX1619, 20 pages, Apr. 1999.

* cited by examiner

Primary Examiner—Gail Verbitsky

(57) ABSTRACT

In one embodiment, an integrated circuit (IC) is provided with a thermal diode and a constant current source. In this embodiment, the saturation current of the diode may be determined by means external to the IC. During normal operation of the IC, the constant current source drives a current to the diode, and the forward bias voltage of the diode is used as a temperature indicator. In another embodiment, an IC is provided with a pair of thermal diodes and a constant current source. During normal operation of the IC, each of the diodes receives a current of different magnitude from the constant current source, and a comparison of the diodes' forward bias voltages is used as a temperature indicator.

17 Claims, 3 Drawing Sheets

TEMPERATURE MEASUREMENT OF AN INTEGRATED CIRCUIT

BACKGROUND OF THE INVENTION

Measurement of an integrated circuit's temperature is typically necessary to prevent overheating of the integrated circuit (IC). Measurement of an IC's temperature can also be useful in the design and test of an IC.

SUMMARY OF THE INVENTION

One aspect of the invention is embodied in an integrated circuit (IC) comprising a number of pads, a constant current source, a thermal diode, and an analog to digital converter. The constant current source provides a current to the thermal diode, which is coupled between first and second ones of the pads. The analog to digital converter i) receives a forward bias voltage of the thermal diode, and ii) outputs a digital representation of the forward bias voltage.

Another aspect of the invention is embodied in a method for measuring the temperature of an IC. In accordance with the method, first and second pads of the IC are coupled to a characterization device (with the first and second pads of the IC being coupled to terminals of a thermal diode of the IC). A first current is then supplied to the thermal diode, via the characterization device, to determine a saturation current of the thermal diode. The characterization device is then disconnected from the IC. During normal operation of the IC, and on-board the IC, a constant current is supplied to the thermal diode while a forward bias voltage of the thermal diode is converted to a digital value. The digital value is then used in conjunction with a digital representation of the saturation current to calculate the temperature of the IC.

Yet another aspect of the invention is embodied in an IC comprising a constant current source, first and second thermal diodes, and a comparator. The constant current source respectively provides first and second currents of different magnitudes to the first and second thermal diodes. The comparator receives forward bias voltages of each of the thermal diodes, compares the forward bias voltages, and outputs a voltage difference indicative of a temperature of the IC.

Other embodiments of the invention are also disclosed.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
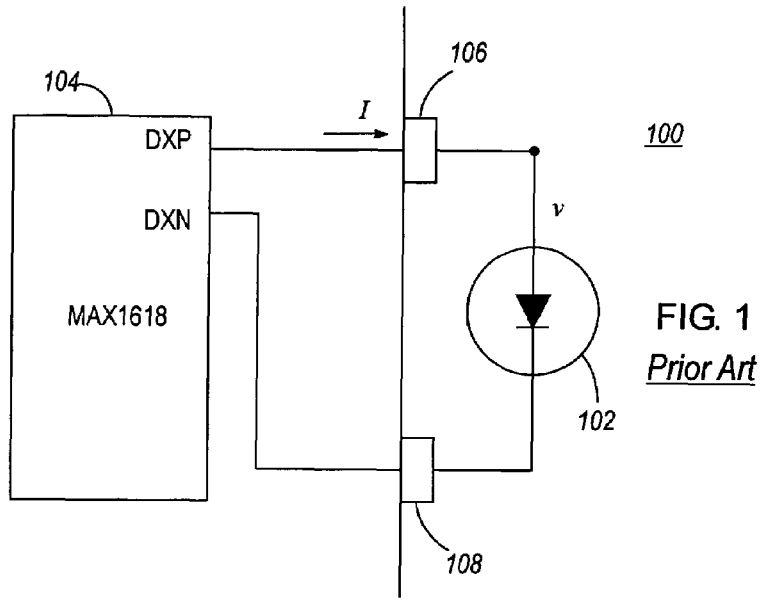
FIG. 1 illustrates a first exemplary integrated circuit (IC) comprising a thermal diode for measuring the temperature of the IC.

One way to measure the temperature of an integrated circuit (IC. 100) is to incorporate a thermal diode 102 into the IC 100, as shown in FIG. 1. If a current is then applied to the diode 102, and the forward bias voltage of the diode 102 is measured, the Shockley equation for the diode 102 can then be solved to determine the temperature of the diode 102. The Shockley equation for a forward-biased diode is:

$$I = I_O(e^{\frac{qv}{nkT}} - 1) \text{ where:}$$

I is the current through the diode,
$I_O$ is the saturation current of the diode,
q is the absolute value of the charge of an electron (i.e., approximately 1.60E-19 coulombs),
v is the forward bias voltage of the diode,
n is the ideality factor of the diode (ranging from 1 to 2; for diodes formed using an IC fabrication process, n=1),
k is Boltzmann's Constant (1.38E-23 Joules/Kelvin), and
T is the temperature of the diode in degress Kelvin.
By solving for T, one arrives at the equation:

$$T = \frac{qv}{nk\ln\left(\frac{I}{I_O}\right)}$$

To solve for the temperature (T) of an IC 100, one needs to obtain values for $I_O$, I and v. Typically, $I_O$ is obtained during a characterization step using, for example, a device 104 such as the MAX1618 or MAX1619 (which are temperature sensing devices produced by Maxim Integrated Products, Inc. of Sunnyvale, Calif., USA). An IC's thermal diode 102 must therefore be provided with a pair of pads 106, 108 for coupling the characterization device 104 to the diode 102. I and v are then obtained during normal operation of the IC 100 by measuring the forward bias voltage (v) of the diode 102 while a known current (I) is being driven to the diode 102. The generation of current I and measurement of voltage v may also be accomplished using the MAX1618 device 104.

One disadvantage of the above method is its dependency on $I_O$, which is highly dependent on process variations. As a result, the saturation currents ($I_O$) need to be determined for many, if not all, of the thermal diodes in a lot of ICs. This can be time-consuming. If the saturation currents are determined for only a few thermal diodes, process variations can lead to relatively large errors in temperature measurement for those IC's whose thermal diodes have not been characterized.

In another temperature measurement approach using Shockley's equation, an IC's thermal diode 102 (FIG. 1) may be successively driven using two currents of different magnitudes ($I_1$, $I_2$). The forward bias voltage of the diode 102 ($v_1$ or $v_2$) is then measured during the application of each current. Assuming that $I_{O1}=I_{O2}$ and $T_1=T_2=T$, substitutions may be made in the above equation for T to obtain the following new equation for T:

$$T = \frac{q\Delta v}{nk\ln\left(\frac{I_2}{I_1}\right)}$$

In this latter equation for T, the saturation current of the IC's thermal diode 102 is no longer a factor, thus eliminating the need to calibrate for process variations in the thermal diode 102. To solve for T, the two currents ($I_1$, $I_2$) and two voltage readings ($v_1$, $v_2$) may be applied/read using the MAX1618 device 104.

Note that in both of the above temperature measurement scenarios, a device 104 such as the MAX1618 needs to be used during normal operation of the IC 100 (i.e., to apply the current I and read the voltage v, or to apply the currents $I_1$, $I_2$ and read the voltages $v_1$, $v_2$). Thus, every production board that requires the monitoring of an IC's temperature must be loaded with a device 104 such as the MAX1618, and the device 104 must be wired to fans and/or additional control logic. One way to alleviate the permanent need for (or use of) a MAX1618 device is shown in FIG. 2.

Figure 2:
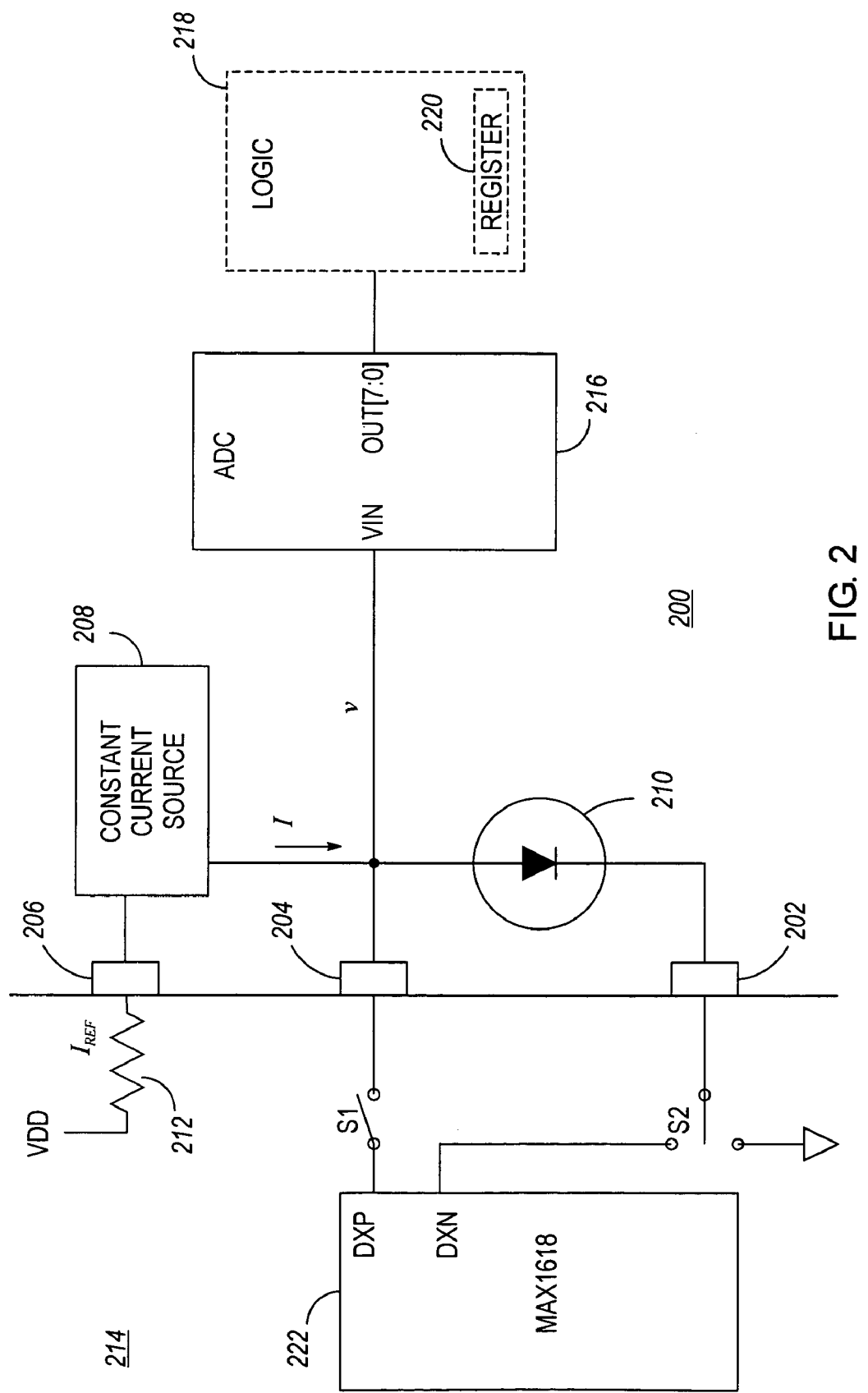
FIG. 2 illustrates a second exemplary IC comprising a thermal diode for measuring the temperature of the IC.

In FIG. 2, an IC 200 is shown to have a number of pads 202, 204, 206, a constant current source 208, and a thermal diode 210. The thermal diode 210 is coupled between first and second ones of the pads 202, 204; and the thermal diode 202 receives a current (I) from the constant current source 208 when one is provided. Optionally, a third pad 206 of the IC 200 may be coupled to an input of the constant current source 208. This third pad 206 may receive a reference current ($I_{REF}$) that serves to control the constant current source 208. Alternately, the reference current may be generated internally to the IC 200, or the constant current source 208 may be controlled in another way.

In one embodiment of the IC 200, the reference current ($I_{REF}$) is provided to the constant current source 208 via a resistor 212 coupled between the third pad 206 of the IC 200 and a voltage potential VDD. Although the resistor 212 may form a part of the IC 200, it may also be mounted on a printed circuit board 214 to which the IC 200 is mounted, as shown in FIG. 2.

The IC 200 may further comprise an analog to digital converter (ADC 216) to 1) receive the forward bias voltage (v) of the thermal diode 210, and 2) output a digital representation of the forward bias voltage. In one embodiment, the forward bias voltage is amplified to fit between a minimum and maximum operating voltage of the IC (e.g., between zero volts and VDD). Such amplification provides better resolution of the forward bias voltage in the digital domain.

In some cases, the output of the ADC 216 may be used to directly influence decisions of the IC 200 (e.g., a decision to activate a fan). In other cases, logic 218 on-board the IC 200 may use the output of the ADC 216 to calculate a temperature of the IC 200. In one embodiment of the IC 200, the logic 218 may be integrated with the ADC 216. In another embodiment of the IC 200, the logic 218 may comprise a temperature look-up table. In yet another embodiment, the IC 200 may comprise a register 220 to store the output of the ADC 216 (possibly in lieu of using the afore-mentioned logic 218 to calculate the temperature of the IC). If provided with a register 220 for storing the output of the ADC 216, the register 220 may be read via instructions (e.g., operating system and/or software application instructions) that are executed during normal operation of the IC 200.

Figure 3:
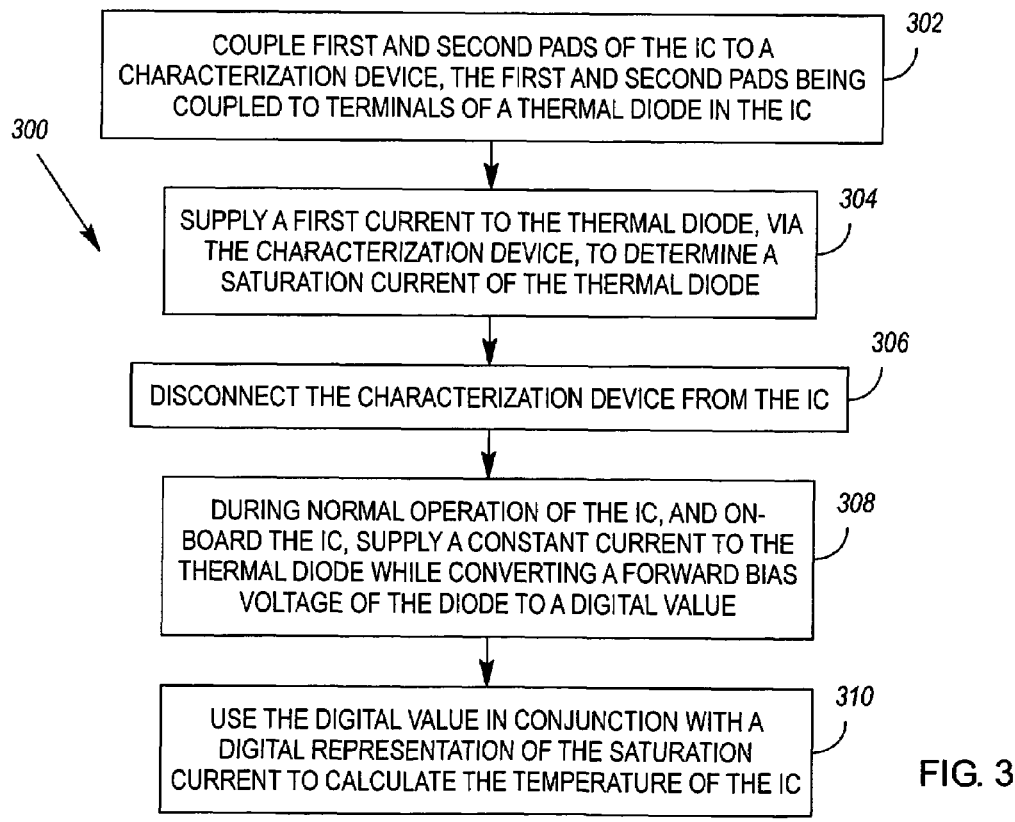
FIG. 3 illustrates an exemplary method for measuring the temperature of the IC shown in FIG. 2.

FIG. 3 illustrates a method 300 for measuring the temperature of the IC 200 shown in FIG. 2. The method 300 comprises coupling 302 the first and second pads 202, 204 of the IC 200 (i.e., the terminals of the thermal diode 210) to a characterization device 222 (e.g., the MAX1618 device). This may be done via switches S1 and S2. A first current is then supplied 304 to the thermal diode 210 via the characterization device 222, to determine a saturation current of the diode 210. Thereafter, the characterization device 222 is disconnected 306 from the IC 200.

During normal operation of the IC 200, and on-board the IC 200, a constant current (I) is supplied 308 to the IC's thermal diode 210 (e.g., via the constant current source 208 on-board the IC 200) while a forward bias voltage of the diode 210 is converted to a digital value. The digital value is then used 310 in conjunction with a digital representation of the diode's saturation current to calculate the temperature of the IC 200. While the constant current is being supplied to the diode 210, the diode 210 may be grounded via pad 202 of the IC 200 and switch S2 of the printed circuit board 214.

In one embodiment, the IC 200 is programmed with the saturation current. Alternately, the saturation current may be stored or retrieved by program code that is executed by the IC 200.

The IC 200 shown in FIG. 2 is useful in that, once the saturation current of its thermal diode 210 is characterized, there is no ongoing need for a device 222 such as the MAX1618. That is, once its thermal diode 210 is characterized, the IC 200 can measure its temperature internally. However, in some situations, it might be useful if characterization of the IC's thermal diode 210 could be dispensed with entirely. An IC 400 which satisfies this need is shown in FIG. 4.

Figure 4:
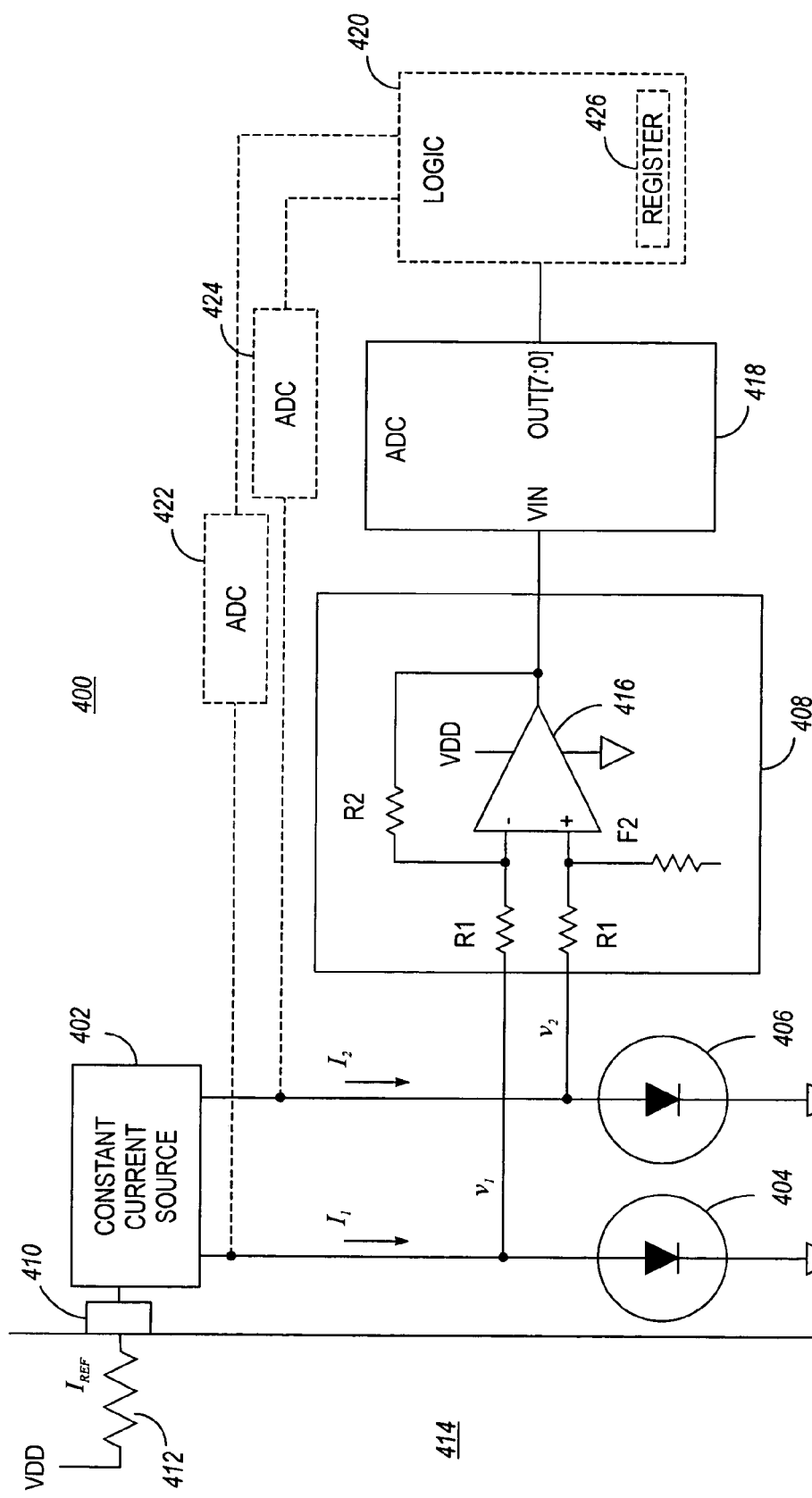
FIG. 4 illustrates a third exemplary IC comprising a thermal diode for measuring the temperature of the IC.

In FIG. 4, an IC 400 is shown to have a constant current source 402, first and second thermal diodes 404, 406, and a comparator 408. The constant current source 402 respectively provides first and second currents ($I_1$, $I_2$) of different magnitudes to the first and second thermal diodes 404, 406. The first and second currents preferably have a known relationship and, in one embodiment, the second current is an integer multiple of the first current. Alternately, the relationship between the first and second currents may be measured.

Optionally, a pad 410 of the IC 400 may be coupled to an input of the constant current source 402. The pad 410 may receive a reference current ($I_{REF}$) that serves to control the constant current source 402. Alternately, the reference current may be generated internally to the IC 400, or the constant current source 402 may be controlled in another way.

In one embodiment of the IC 400, the reference current ($I_{REF}$) is provided to the constant current source 402 via a resistor 412 coupled between the pad 410 of the IC 400 and a voltage potential VDD. Although the resistor 412 may form a part of the IC 400, it may also be mounted on a printed circuit board 414 to which the IC 400 is mounted, as shown in FIG. 4.

The comparator 408 receives the forward bias voltages ($v_1$, $v_2$) of each of the thermal diodes 404, 406, compares the bias voltages, and then outputs a voltage difference that is indicative of the temperature of the IC 400. As shown in FIG. 4, the comparator 408 may be implemented by means of a differential amplifier 416.

The IC 400 may further comprise an ADC 418 to 1) receive the voltage difference output by the differential amplifier 416, and 2) output a digital representation of the voltage difference. In one embodiment, the voltage difference is amplified to fit between a minimum and maximum operating voltage of the IC 400 (e.g., between zero volts and VDD). Such amplification provides better resolution of the voltage difference in the digital domain.

In some cases, the output of the ADC 418 may be used to directly influence decisions of the IC 400 (e.g., a decision to activate a fan). In other cases, logic 420 on-board the IC 400 may use the output of the ADC 418 to calculate a temperature of the IC 400. To do this, the logic 420 needs to know the relationship between the currents that are provided to the first and second thermal diodes 404, 406. If the relationship is known, the logic 420 may be configured in accordance with this relationship. If the relationship is not known, or if the relationship is subject to change due to, for example, process variations in the constant current source 402 or variations in $I_{REF}$, then the IC 400 may further comprise one or more ADCs 422, 424 to 1) respectively receive the first and second currents from the constant current source 402, and 2) output digital representations of the first and second currents to the logic 420. Although real-time measurement of the currents may in some cases provide for a more accurate temperature measurement, it is believed the better course of action is to design the constant current source 402 so that it provides a known and reproducible relationship between its output currents.

In one embodiment of the IC 400, the logic 420 that calculates the temperature of the IC 400 may be integrated with the ADC 418. In another embodiment of the IC 400, the logic 420 may comprise a temperature look-up table. In yet another embodiment, the IC 400 may comprise a register 426 to store the output of the ADC 418 (possibly in lieu of using the afore-mentioned logic 420 to calculate the temperature of the IC 400). If provided with a register 426 for storing the output of the ADC 418, the register 426 may be read via instructions (e.g., operating system and/or software application instructions) that are executed during normal operation of the IC 400.

To improve the accuracy of temperature measurements within the IC 400, its thermal diodes 404, 406 are preferably of like construction. To achieve such like construction, the thermal diodes 404, 406 may be positioned adjacent one another, and may have traces of uniform width and length routed to and from them.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An integrated circuit, comprising:
a number of pads;
a constant current source to provide a current;
a thermal diode that receives said current, said thermal diode being coupled between first and second ones of said pads; and
an analog to digital converter to i) receive a forward bias voltage of the thermal diode, and ii) output a digital representation of the forward bias voltage;
wherein a third one of said pads is provided to receive a reference current, said third pad being coupled to an input of said constant current source, said reference current serving to control the constant current source.

2. The integrated circuit of claim 1, further comprising logic to receive the digital representation of the forward bias voltage and calculate a temperature of the integrated circuit.

3. The integrated circuit of claim 2, wherein said logic comprises a temperature look-up table.

4. The integrated circuit of claim 1, further comprising a register to store the digital representation of the forward bias voltage, said register being readable during normal operation of the integrated circuit.

5. An integrated circuit, comprising:
a constant current source to provide first and second currents of different magnitudes;
first and second thermal diodes that respectively receive said first and second currents;
a comparator to receive forward bias voltages of each of the thermal diodes, to compare the forward bias voltages, and to output a voltage difference indicative of
a temperature of the integrated circuit; and
a pad to receive a reference current, said pad being coupled to an input of said constant current source, said reference current serving to control the constant current source.

6. The integrated circuit of claim 5, wherein the thermal diodes are positioned adjacent one another.

7. The integrated circuit of claim 5, wherein the first and second currents have a known relationship.

8. The integrated circuit of claim 5, wherein the second current is an integer multiple of the first current.

9. The integrated circuit of claim 5, wherein the comparator is a differential amplifier.

10. The integrated circuit of claim 9, further comprising an analog to digital converter to i) receive the voltage difference output by the differential amplifier, and ii) output a digital representation of the voltage difference.

11. The integrated circuit of claim 10, further comprising logic to receive the digital representation of the voltage difference and calculate a temperature of the integrated circuit.

12. The integrated circuit of claim 5, further comprising an analog to digital converter to i) receive the voltage difference output by the comparator, and ii) output a digital representation of the voltage difference.

13. The integrated circuit of claim 12, further comprising logic to receive the digital representation of the voltage difference and calculate a temperature of the integrated circuit.

14. The integrated circuit of claim 13, wherein said logic is configured in accordance with a known relationship between the first and second currents.

15. The integrated circuit of claim b 13, wherein said logic comprises a temperature look-up table.

16. The integrated circuit of claim 13, further comprising one or more analog to digital converters to i) respectively receive said first and second currents, and ii) output digital representations of said first and second currents to said logic.

17. The integrated circuit of claim 12, further comprising a register to store the digital representation of the voltage difference, said register being readable during normal operation of the integrated circuit.

* * * * *